United States Patent [19]

de la Bouillerie

[11] 4,193,425

[45] Mar. 18, 1980

[54] ELECTROHYDRAULIC SERVO-VALVE

[75] Inventor: Geoffroy de la Bouillerie, Paris, France

[73] Assignee: Societe d'Optique, Precision Electronique et Mecanique-Sopelem, Paris, France

[21] Appl. No.: 819,614

[22] Filed: Jul. 26, 1977

[30] Foreign Application Priority Data

Aug. 20, 1976 [FR] France ............................ 76 25314

[51] Int. Cl.[2] .......................................... F16K 31/10

[52] U.S. Cl. ............................ 137/861; 137/625.61; 137/625.64; 251/138

[58] Field of Search .................... 137/625.61, 625.64, 137/625.63, 861; 91/51; 251/344, 340, 138, 319, 129, 321, 320

[56] References Cited

U.S. PATENT DOCUMENTS

| | | | |
|---|---|---|---|
| 2,327,366 | 8/1943 | Nampa | 251/138 X |
| 3,065,145 | 11/1962 | Molander, Jr. et al. | 137/625.64 X |
| 3,093,155 | 6/1963 | Dawes | 251/340 X |
| 3,588,039 | 6/1971 | Chelminski et al. | 251/129 X |

*Primary Examiner*—Arnold Rosenthal

*Attorney, Agent, or Firm*—Haseltine, Lake & Waters

[57] ABSTRACT

An electrohydraulic servo-valve comprises a fixed liner having an inner duct for hydraulic fluid communicating with at least one opening in the liner for substantially radial outward flow, the effective area of the opening being controlled by a sleeve around and slidable relative to the liner, movement of the sleeve being controlled by a torque motor having an electric control for causing oscillation in a plane, the torque motor being connected to the sleeve by a spindle subject to the torque motor and a return spring and articulated on the sleeve.

11 Claims, 10 Drawing Figures

ELECTROHYDRAULIC SERVO-VALVE

The present invention concerns a servo-valve, that is to say, a device which enables a hydraulic flow or pressure to be controlled proportionally with a low energy energy electrical control signal.

A servo-valve includes at a minimum a hydraulic regulator controlled by an electric motor. Distinction is made between flow-control servo-valves and pressure-control servo-valves. A servo-valve for regulation of flow has the purpose of regulating the flow of fluid in proportion to the electrical control signal. A pressure-control servo-valve has the purpose of regulating the pressure in proportion to the electrical control signal.

A known hydraulic regulator is formed of a slide mounted in a lining (or sleeve) which is provided with orifices for the flow of the hydraulic fluid. Displacement of the slide modifies the areas of flow at the orifices, these areas of flow being annular.

The slide regulator is generally controlled by a differential pressure controlled by a hydraulic amplifier which enables the control force to be reduced and accurate positioning to be obtained. Hence the slide regulator constitutes only the second stage of the servo-valve. The hydraulic amplifier which is used to control the second-stage slide comprises a paddle moving between two nozzles and two fixed nozzles.

The foregoing hydraulic amplifier, also called a hydraulic potentiometer, may be used for direct control of a power member. However, the power supplied by a moving-paddle stage is limited and it is not in general possible to obtain large flows at low pressures.

In French Patent Application No. 72-12601 a paddle servo-valve is described which, with only one stage, enables large flows at low pressures to be obtained. This servo-valve is essentially characterized by displacement of the paddle perpendicular to the axis of the nozzles, which avoids the disadvantage, encountered in conventional systems, of the displacement of the paddle being restricted to the gap between the nozzles. However, the powers capable of being controlled by this type of servo-valve must not be too high.

According to the invention there is provided an electrohydraulic servo-valve comprising:

a torque motor comprising electric control means for causing oscillation in a plane;

a spindle;

means connecting said spindle to said torque motor for oscillation thereby;

a return spring acting on said spindle;

a sleeve having a cylindrical bore;

an articulation connecting said spindle to said sleeve for oscillation of said sleeve thereby;

a fixed liner received in said cylindrical bore of said sleeve and defining an inner duct for hydraulic fluid communicating with at least one opening in said liner for substantially radial outward flow of fluid, the effective area of said opening being controlled by said sleeve.

In one embodiment of the invention said sleeve is provided with at least one opening for radial flow of the fluid and which is associated with said opening in said liner.

Said torque-motor may be arranged so that the plane of oscillation of said spindle is parallel with the axis of said liner and said sleeve, or so that the plane of oscillation of said spindle is perpendicular to the axis of said liner and said sleeve.

The invention will be more fully understood from the following description of embodiments thereof, given by way of example only, with reference to the accompanying drawings.

Figure 2:
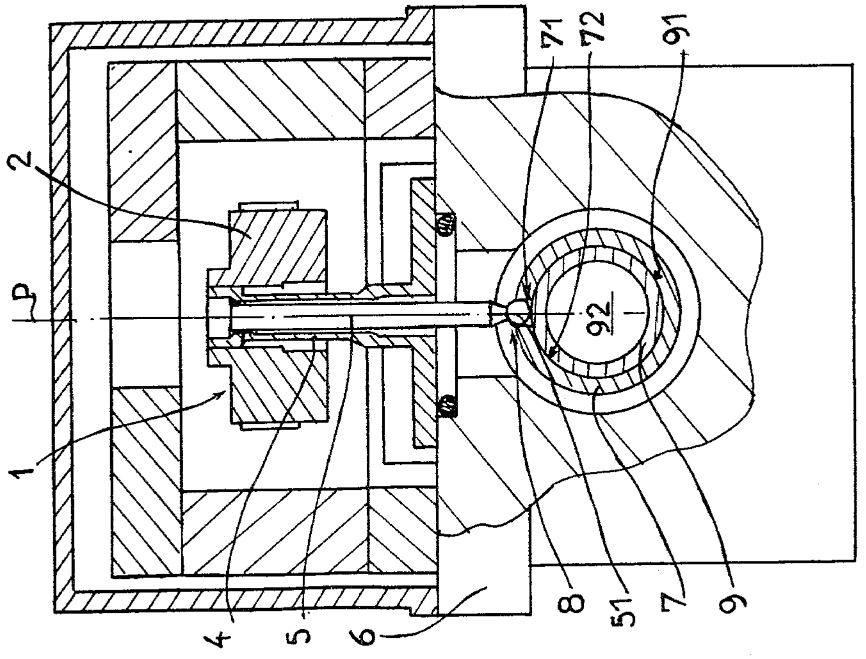
FIG. 2 is a section along the line II—II in FIG. 1.

The servo-valves shown in FIGS. 1 to 10 each comprise a torque motor 1 which receives an electrical signal and is used for positioning the moving parts of the servo-valve. This torque motor comprises an armature 2 which can move in the gap of a permanent magnet 31 of the motor, the north and south poles of which are marked N and S in the Figures. The moving armature 2 is connected to a spring 4 which is used for returning the armature to a neutral position and to a spindle 5 which is used to manipulate the moving parts. The armature 2 is surrounded by coils 32 which receive the control currents.

In the embodiments shown in the Figures the torque motor is of dry type. The spring 4 is in the form of a tube and the spindle 5 passes through it. The spring tube 4 is attached in an oiltight way to the body 6 of the servo-valve and serves to ensure oiltightness between the fluid and the torque motor components. The torque motor 1 may alternatively be of wet type.

The servo-valve includes a sleeve 7 which is housed in a chamber 61 in the servo-valve. This sleeve is coupled by means of an articulation 8 to the lower end of the spindle 5. The articulation 8 enables oscillation of the sleeve with respect to the spindle 5 and enables slight displacements of the sleeve with respect to the spindle 5 along the axis of the spindle to be absorbed. This articulation comprises a sphere 51 cut at the lower end of the spindle 5, which engages without play in a seating 71 cut in the sleeve 7. The articulation 8 may be achieved by any other equivalent means.

The servo-valve includes a liner 9 which passes through the chamber 61 in which the sleeve 7 is housed. The liner 9 is held fixed in the body 6 of the servo-valve and is provided with an outer cylindrical bearing surface 91. The sleeve 7 is fitted on to the liner. The inner bore 72 of the sleeve is fitted with minimum clearance to the outer bearing surface 91 of the liner so that guidance of the sleeve is accurate and so that internal leakages of hydraulic fluid between the sleeve and the liner are reduced to a minimum.

The chamber 61 in which the liner and the sleeve are housed communicates with an exhaust duct 62 which is used for the return of oil. The chamber 61 is isolated from an oil inlet duct 63. In the embodiments shown the chamber 61 is isolated from the torque motor by the spring tube 4.

The liner 9 includes at least one inner duct 92 used to channel the hydraulic fluid. Preferably the end of the duct 92 is blocked by an oiltight seal 11 and inlet of hydraulic fluid into the duct 92 is effected by one or more lateral orifices 93. Inlet of fluid to the orifices 93 is effected through the inlet duct 63 and an annular chamber 64 surrounding the liner.

Oiltightness of this annular chamber arranged between the liner and the body is ensured by oiltight seals 101 and 102.

The liner 9 includes one or more lateral openings 94 which enable radial flow of fluid from the duct 92 towards the chamber 61. The area of flow of the fluid through the openings is controlled by the sleeve 7, the position of which is determined by the electrical signal applied to the torque motor.

The means employed for controlling the effective area of the openings 94 differ in the embodiments.

Figure 1:
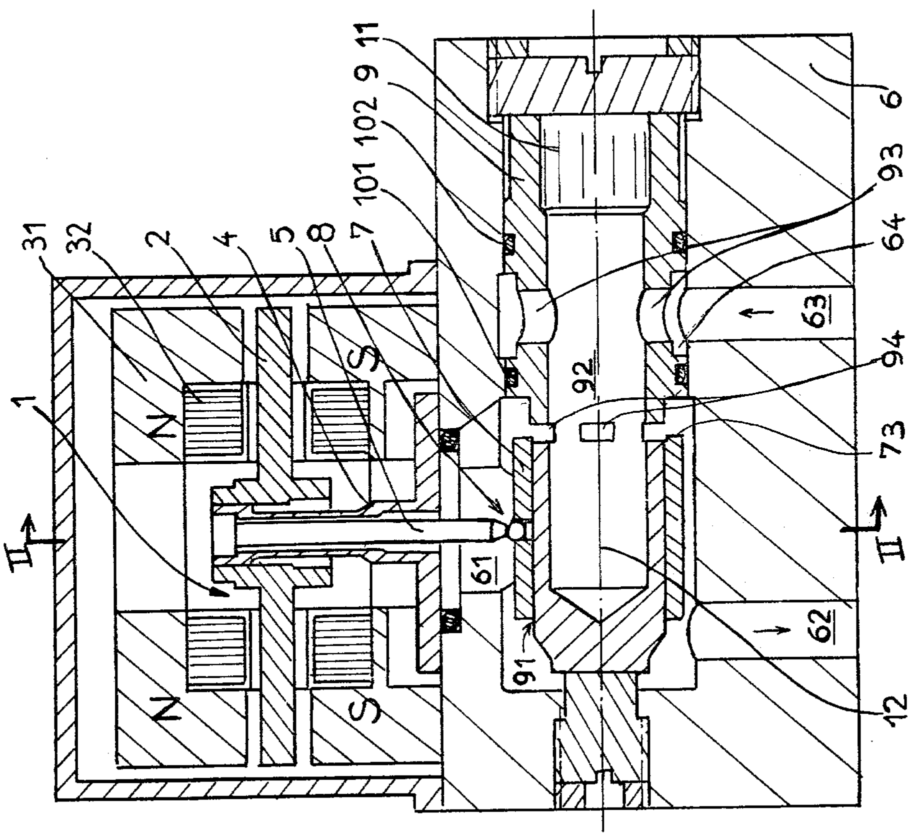
FIG. 1 is a section through a first embodiment of a servo-valve in accordance with the invention.

In the embodiment of FIGS. 1 and 2 one annular end face 73 of the sleeve is positioned in front of the openings 94 so that oil flow leaving the openings 94 flows radially against the face 73. The control of the area of flow of the fluid through the openings 94 is obtained by displacement of the sleeve in a direction parallel with the axis 12 of the sleeve and the liner. The torque motor 1 is positioned so that the plane of oscillation P of the spindle 5 passes through the axis 12 of the sleeve and the liner.

Figure 4:
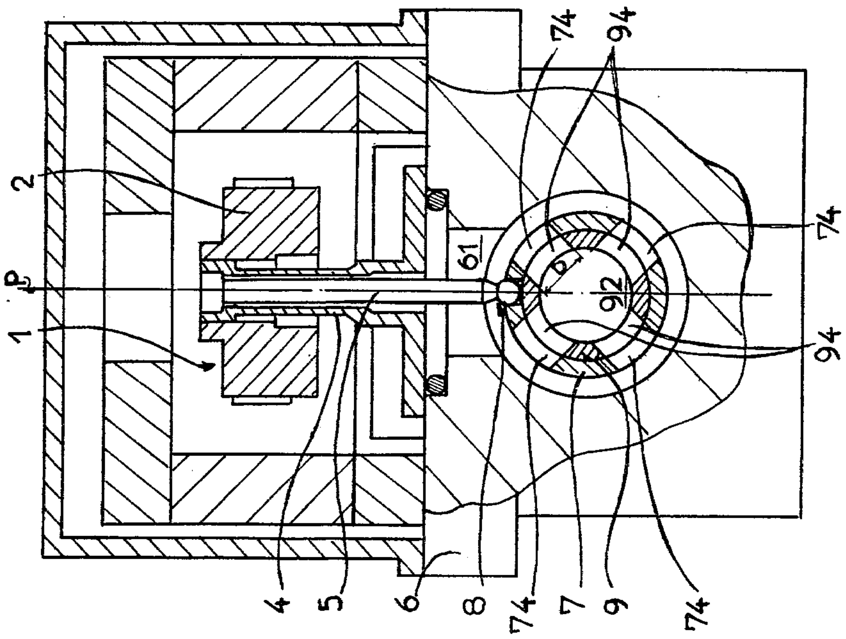
FIG. 4 is a section along the line IV—IV in FIG. 3.
Figure 3:
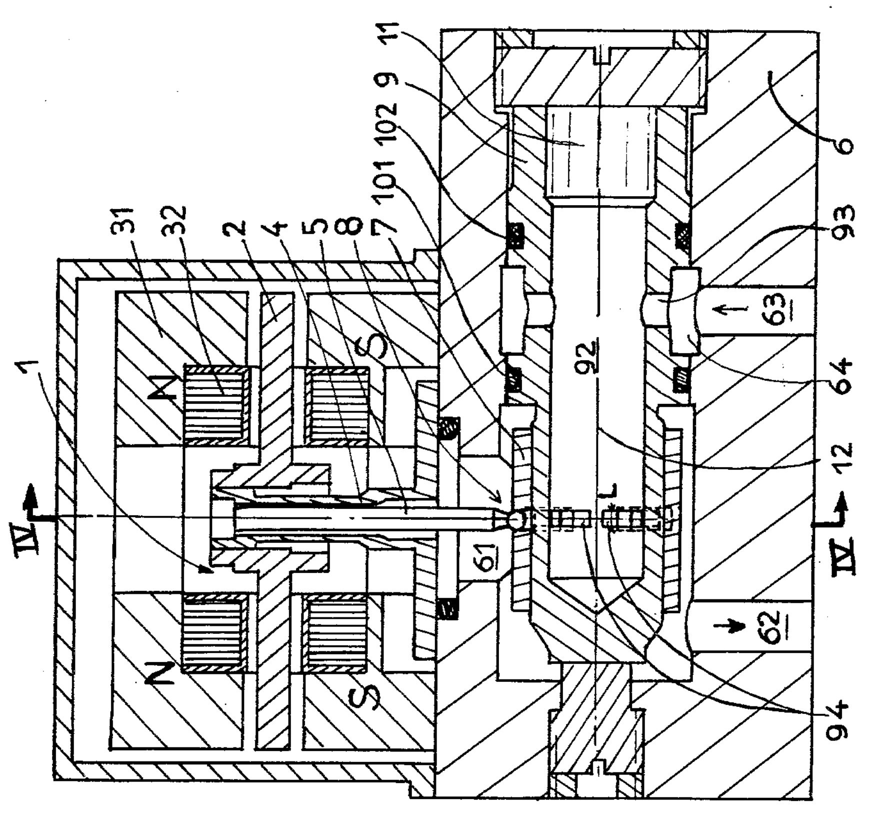
FIG. 3 is a section through a second embodiment of a servo-valve in accordance with the invention.
Figure 6:
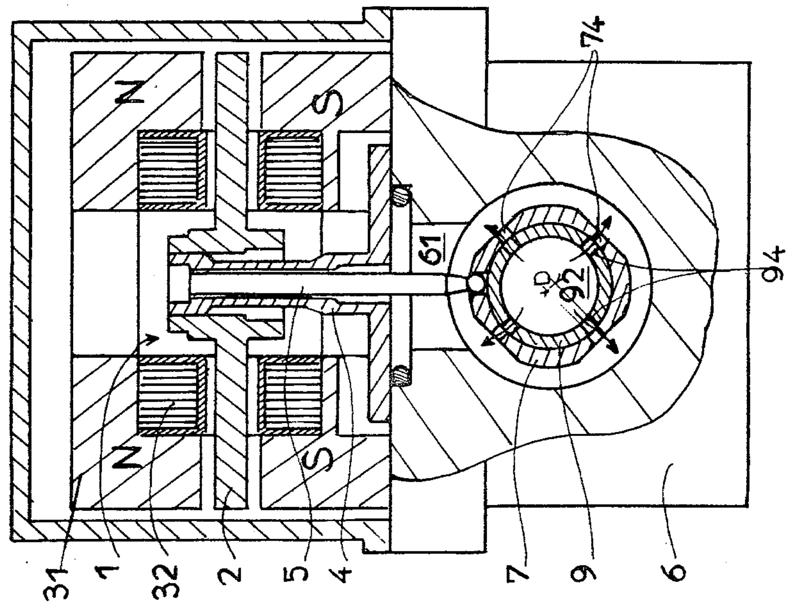
FIG. 6 is a section along the line VI—VI in FIG. 5.
Figure 5:
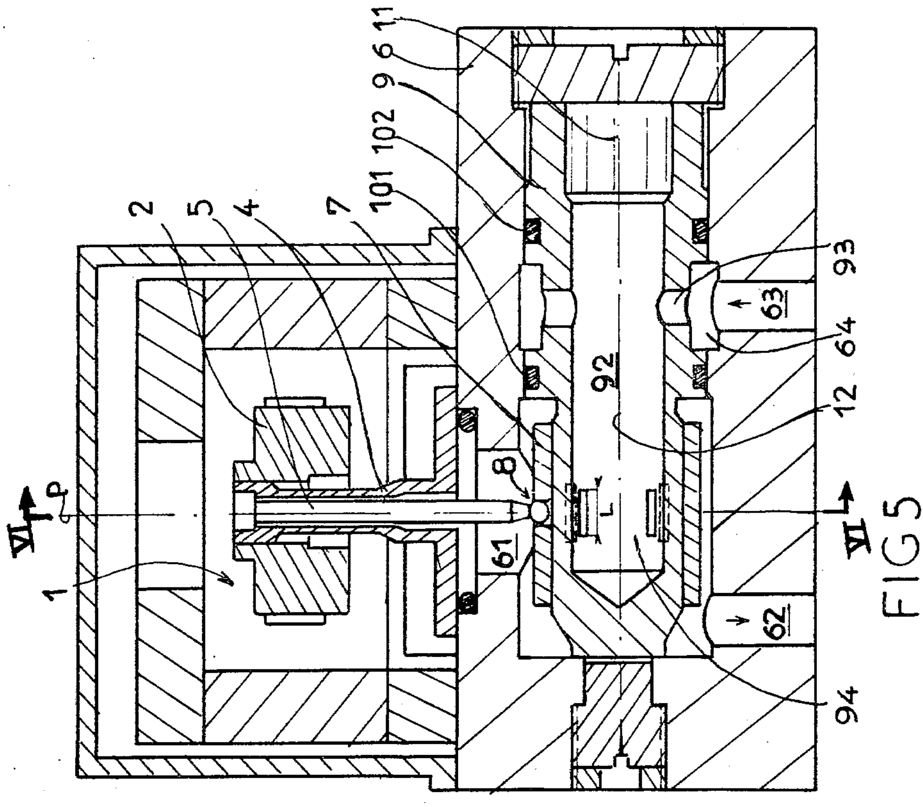
FIG. 5 is a section through a third embodiment of a servo-valve in accordance with the invention.

In the embodiment of FIGS. 3 and 4 and in the embodiment of FIGS. 5 and 6 the sleeve is pierced by openings 74 radially aligned with openings 94. Hence the oil flows radially to the chamber 61 through the openings 94 and 74.

In the embodiment of FIGS. 3 and 4 the sleeve is displaced with respect to the liner in a straight line parallel with the axis 12 of the liner and the sleeve. Each opening 74 has a face perpendicular to the axis 12 which determines the effective area of flow of the fluid through the corresponding opening 94. The torque motor is positioned so that the plane of oscillation P of the spindle 5 passes through the axis 12 of the liner and the sleeve or is parallel with this axis 12.

The openings 74 and 94 are preferably rectangular. In this embodiment the length L of the openings 94 and 74 in a direction parallel with the axis 12 is relatively small while the width D perpendicular to the axis 12 is relatively large. This form of the openings enables large variations in area for small linear displacements of the sleeve.

In the embodiment of FIGS. 5 and 6 the displacement of the sleeve with respect to the liner is an angular displacement about the axis 12 of the liner and the sleeve. In this embodiment each opening 74 has a face parallel with the axis 12 which determines the area of flow of the fluid through the openings 94. The torque motor is positioned so that the plane of oscillation P of the spindle 5 is perpendicular to the axis 12 of the liner and the sleeve. The openings 74 and 94 are preferably rectangular, the width L of the openings 94 and 74 in a direction parallel with the axis 12 is relatively large while the width D perpendicular to the axis 12 is relatively small. This form of the openings enables large variations in area for small angular displacement of the sleeve.

The servo-valves shown in FIGS. 1 to 6 may be used for control of flow and are two-way, the variable delivery being arranged between the inlet duct 63 and the outlet duct 62.

Figure 7:
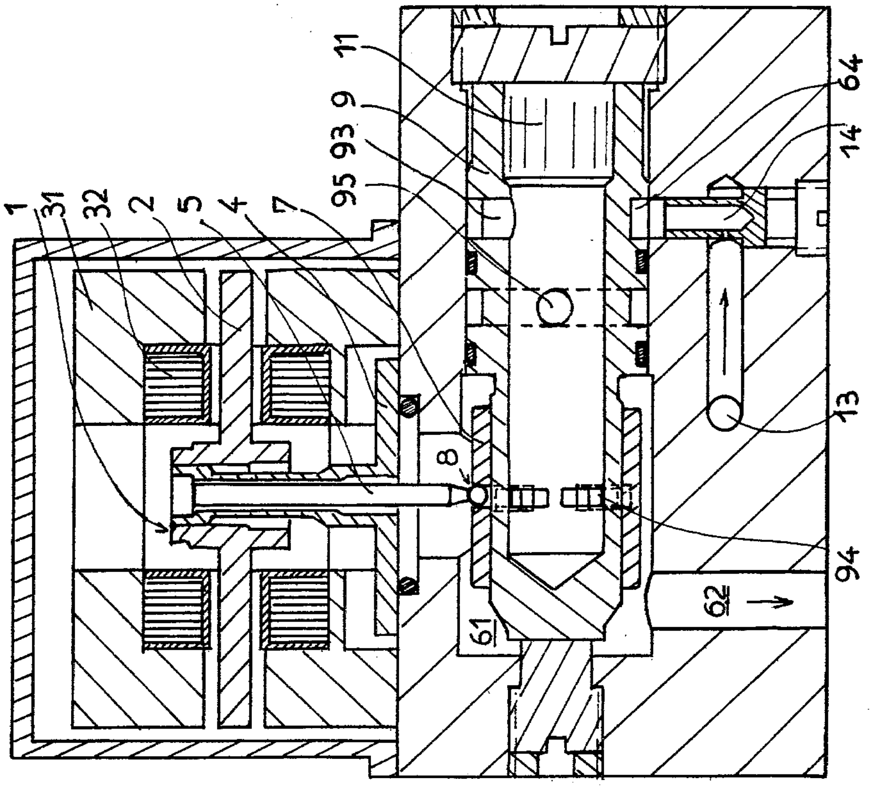
FIG. 7 is a section through an embodiment of a three-way servo-valve in accordance with the invention and used for pressure control.

The servo-valve shown in FIG. 7 is used for control of pressure. It is a three-way servo-valve with a fixed nozzle of "single hydraulic potentiometer" type. The duct in the liner is fed with fluid under pressure from a feed duct 13 via a fixed nozzle 14 and channels opening into the orifice 93. The load outlet opens into the liner through an orifice 95. The control of the leakage flow through the sleeve may be obtained by linear or angular displacements of the sleeve as in the preceding embodiments.

Figure 8:
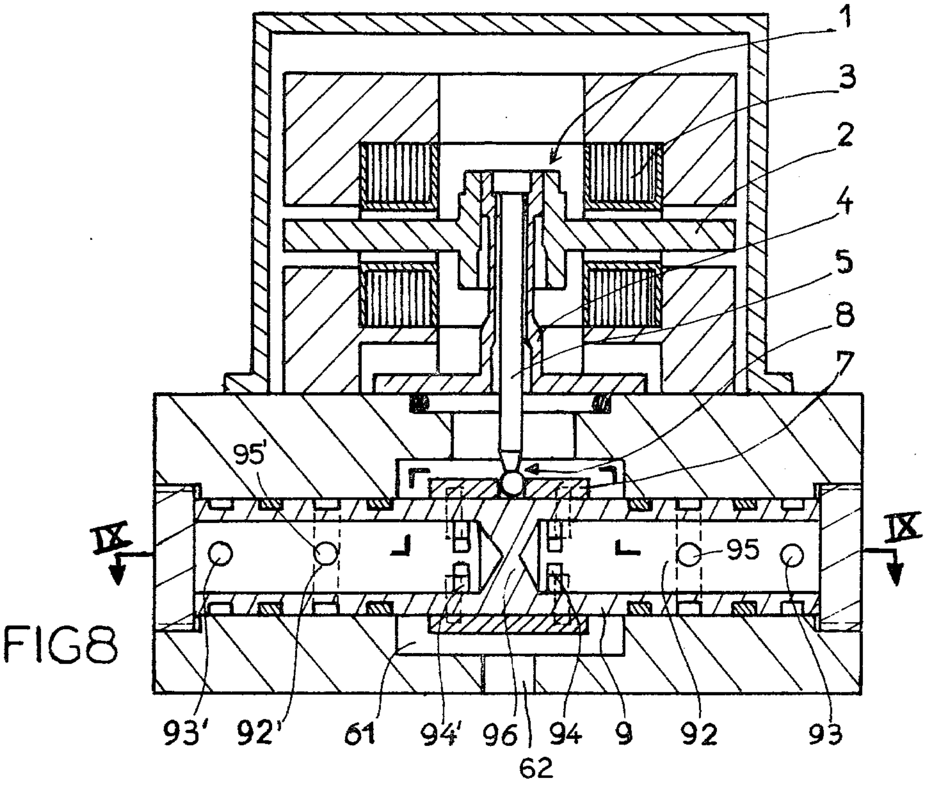
FIG. 8 is a section through an embodiment of a four-way servo-valve in accordance with the invention, used for control of differential pressure.
Figure 9:
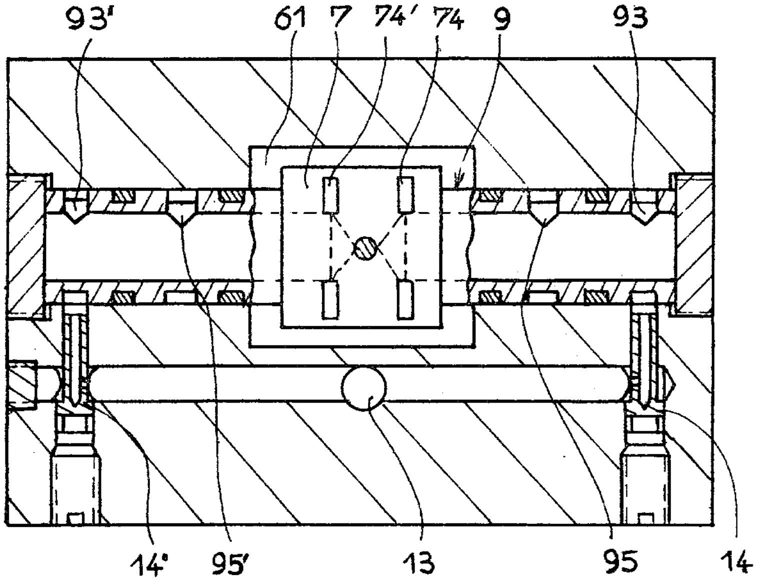
FIG. 9 is a section along the line IX—IX in FIG. 8.

The servo-valve shown in FIGS. 8 and 9 is used for the control of pressure. It is a four-way servo-valve of double hydraulic potentiometer type. The liner includes two ducts 92 and 92' independent of one another and separated by a partition 96. Fluid outlet openings 94 and 94' controlled by the sleeve 7 open into each of the ducts. Each of the ducts 92 and 92' is fed with fluid under pressure from the feed orifice 13 by way of a fixed nozzle 14 or 14' and an orifice 93 or 93'. Two load outlets 95 and 95' open each into one of the ducts in the liner.

The arrangement of the orifices 94 and 94' is such that a displacement of the sleeve 7 causes an increase in the area of flow through the orifices associated with one duct in the liner and simultaneously a reduction in the area of flow through the orifices associated with the other duct in the liner. In the rest position the areas of flow are equal. For example, displacement of the sleeve causes an increase of the leakage flow through the orifices 94 and a reduction of the leakage flow through the orifices 94', the pressure in the one load outlet therefore increasing to the detriment of the pressure in the other load outlet.

The sleeve is displaced linearly along the axis of the liner. In the rest position the orifices 74 and 74' in the sleeve are symmetrical with respect to the orifices 94 and 94' and partially cover them so that the outlet flows are equal. Displacement of the sleeve 7 along the axis of the liner increases (or reduces) the flow through the orifices 94 and reduces (or increases) the flow through the orifices 94'.

In a modification (not shown) the sleeve is angularly displaced about the axis of the liner as in the servo-valve shown in FIGS. 5 and 6.

Figure 10:
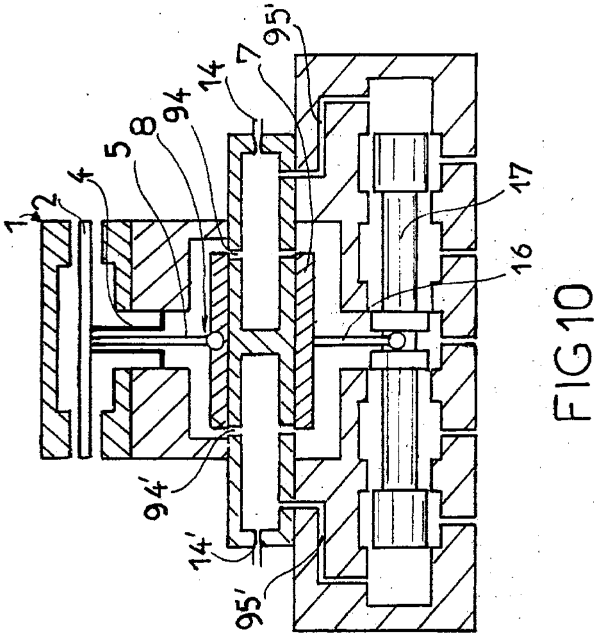
FIG. 10 is a diagram of an embodiment of a two-stage servo-valve in accordance with the invention and endowed with mechanical control between the two stages.

The servo-valve shown in FIG. 10 is a servo-valve having two stages and four ways. The sleeve 7 is extended by a feedback rod 16 used for mechanical control from the slide 17 of the second stage.

Of course the invention is not intended to be restricted to the embodiments described and illustrated but encompasses any variants within the scope of the appendent claims.

There is thus provided a servo-valve which does not have the disadvantages of known servo-valves. The valve can be used for flow or pressure control, and, with only one stage, enables large flows with low pressures and relatively high powers to be obtained. The surfaces for flow of the fluid are not subjected to the restrictions that are encountered in paddle systems. The servo-valve is easy to produce and to adjust and it is not very sensitive to pollution. The servo-valve can easily be provided with variable gain by making the area of flow of fluid vary according to a non-linear law as a function of the control current (parabolic variation, etc.). The servo-valve may comprise a single stage or may form part of a servo-valve with a number of stages.

What is claimed is:

1. An electrohydraulic servo-valve comprising a body with a torque motor comprising: permanent magnet means associated with coils for receiving control currents and a movable armature connected to a spring attached to said body and to a spindle which oscillates in a plane; a liner fixed in said body having an outer cylindrical bearing surface and an inner duct for a fluid and at least one opening enabling a substantially radial flow of fluid from said inner duct; a sleeve having a cylindrical bore engaged with minimum clearance on said outer bearing surface of said liner, for controlling the effective area of said opening and an articulation connecting said sleeve to the end of said spindle to thereby oscillate said sleeve.

2. An electrohydraulic servo-valve comprising: a body with a torque motor comprising permanent magnet means associated with coils which receive control currents and a movable armature connected to a spring attached to said body and to a spindle which oscillates in a plane and is provided at its end with a sphere; a liner fixed in said body having an outer cylindrical bearing surface and an inner duct for a fluid and at least one opening enabling substantially radial flow of fluid from said inner duct; a sleeve having a cylindrical bore engaged with minimum clearance on said outer bearing surface of said liner so as to control the effective area of said opening and provided with seating means in which the said sphere is engaged.

3. An electrohydraulic servo-valve comprising: a body with a torque motor comprising permanent magnet means associated with coils which receive control currents and a movable armature connected to a spring attached to said body and to a spindle which oscillates in a plane; a liner fixed in said body having an outer cylindrical bearing surface and an inner duct for a fluid and at least one opening enabling substantially radial flow of fluid from said inner duct; a sleeve having a cylindrical bore engaged with minimum clearance on said outer bearing surface of said liner and pierced with a least one opening controlling the area of flow of fluid through the said opening of said liner; an articulation connecting said sleeve to the end of said spindle for oscillation of said sleeve thereby.

4. An electrohydraulic servo-valve as claimed in claim 3, wherein: said articulation comprises a seating cut in said sleeve and a sphere provided at the end of said spindle and engaged in said seating in said sleeve.

5. An electrohydraulic servo-valve as claimed in claim 1, wherein: the inner duct of the said liner is fed with fluid through a nozzle.

6. An electrohydraulic servo-valve as claimed in claim 2, wherein: the inner duct of the said liner is fed with fluid through a nozzle.

7. An electrohydraulic servo-valve as claimed in claim 1, wherein: the spring is a tube fixedly attached to the said body, the spindle passing through said tube.

8. An electrohydraulic servo-valve as claimed in claim 3, wherein: said torque motor is arranged so that the plane of oscillation of said spindle is parallel with the axis of said liner and said sleeve.

9. An electrohydraulic servo-valve comprising: a body with a torque motor comprising permanent magnet means associated with coils which receive control currents and a movable armature connected to a spring attached to said body and to a spindle which oscillates in a plane; a liner fixed in said body having an outer cylindrical bearing surface and two independent inner ducts each fed by a fluid through a nozzle, and at least two openings connected one to said duct and the other to the other said duct for substantially radial outward flow of fluid; a sleeve having a cylindrical bore engaged with minimum clearance on said outer bearing surface of said liner, for controlling the effective area of said openings so that displacement of said sleeve causes an increase in the area of flow through one of said openings and a reduction in the area of flow through the other said opening; and an articulation connecting said sleeve to the end of said spindle for oscillation of said sleeve thereby.

10. An electrohydraulic servo-valve as claimed in claim 9, wherein: said articulation comprises a seating cut in said liner and a sphere provided at the end of said spindle and engaged in said seating in said sleeve.

11. An electrohydraulic servo-valve as claimed in claim 9, wherein: the said sleeve is pierced with at least two openings which control the flow of fluid through said opening connected to one duct and through said opening connected to the other duct.

* * * * *